Dec. 19, 1961
M. D. TUPPER
3,014,140
CONTACT TERMINAL AND LAMINATION SECURING ARRANGEMENT
FOR ELECTRIC DEVICES AND METHOD OF ASSEMBLING SAME
Filed March 30, 1959
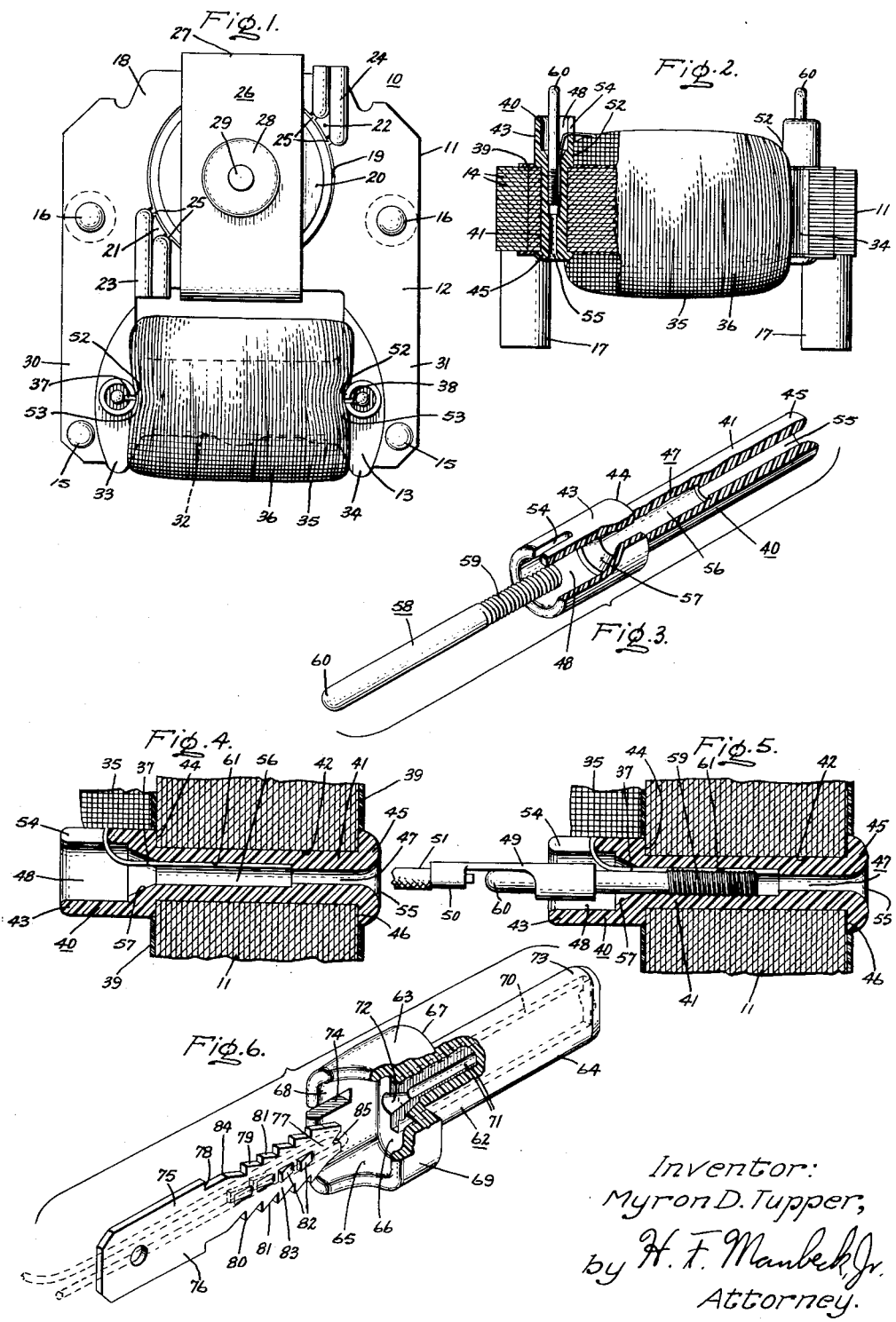
Inventor:
Myron D. Tupper,
by H. F. Manbeck, Jr.
Attorney.

United States Patent Office 3,014,140
Patented Dec. 19, 1961

3,014,140
CONTACT TERMINAL AND LAMINATION SECURING ARRANGEMENT FOR ELECTRIC DEVICES AND METHOD OF ASSEMBLING SAME
Myron D. Tupper, Fort Wayne, Ind., assignor to General Electric Company, a corporation of New York
Filed Mar. 30, 1959, Ser. No. 802,764
9 Claims. (Cl. 310—71)

This invention relates in general to small electric devices such as fractional horsepower motors and more particularly to a terminal and lamination securing arrangement for such devices, and the method of assembling same.

Certain kinds of electric motors of the small horsepower type are conventionally formed with a substantially U-shaped laminated stator having a rotor mounted for rotation in the bight portion of the U. A laminated core section, which carries a wound coil or excitation winding thereon, bridges the bottom leg portions of the stator thereby completing a magnetic circuit for the stator. This excitation winding or coil has a pair of leads in wire extremities which must be attached in some suitable manner, such as by terminal means, to the energizing external wire leads for making electrical motor operating connections. Since electric motors of the small sizes, such as in the fractional horsepower group, generally utilize coils wound with relatively thin wire coated with an enamel material (commonly known as "magnet wire"), considerable difficulty has been experienced in attaching the wire ends to terminal means whereby such connection has suitable electrical as well as mechanical characteristics. For example, if the wire coating is not effectively removed at the place of attachment with the terminal, a defective electrical connection will result. Further, if the coil ends are not properly attached and protected, they may break off close to the winding where it is extremely arduous to make a repair connection or to provide a new terminal. Moreover, it is the general practice in the production and manufacture of such motors to utilize the coil ends to energize the coil for testing purposes, increasing the probability that the coil ends may suffer injury which may utlimately result in motor inoperativeness.

Thus, it will be seen that the provision of a satisfactory but inexpensive terminal arrangement for connecting and protecting the coil lead-in wires is a continuing problem in motor manufacture, particularly in the fractional horsepower sizes.

Accordingly, it is a primary object of this invention to provide an improved arrangement for connecting coil ends to a contact terminal involving a minimum of parts and manufacturing costs.

It is another object of the invention to provide a terminal assembly which is cheap to manufacture, can be quickly and easily installed and is effective in providing an excellent electrical connection with a motor energizing winding.

It is a further object of the invention to provide an improved contact terminal and lamination securing arrangement for electric motors in which a single terminal construction not only is adapted to connect the coil windings to a suitable power source, but in addition, provides the means for securing laminations of a coil core together and supports the sides of the coil windings in a predetermined position.

A still further object of the invention is the provision of a terminal arrangement which not only affords a good electrical and mechanical connection with the ends of the coil for actual motor operation, but also permits the motor to be readily connected for testing purposes during the manufacture of such motor without an eleborate test connecting arrangement.

Yet another object of the invention is the provision of an improved method of assembling a terminal arrangement to an electric motor and its associated energizing winding.

Further objects and advantages will become apparent as the following description proceeds and the subject matter which I regard as my invention is pointed out with particularity in the claims annexed to and forming a part of this specification.

In carrying out the objects of my invention in one form thereof, I provide an improved terminal arrangement particularly suitable for an electric device having a magnetic core formed of a plurality of superposed laminations with an excitation coil wound thereon. The terminal arrangement comprises an insulated longitudinally extending mounting sheath arranged to extend through aligned apertures formed in the laminations for accommodating the sheath. The sheath is formed with lamination securing means and has a longitudinally extending central passageway formed therein for accommodating a coil lead-in wire and a quick connect male terminal member composed of conducting material. The terminal member is provided with a terminal end portion and an anchoring end portion spaced from the terminal portion. The anchoring portion has projecting means for engaging the inner wall of the passageway and contacting the lead-in wire. The projecting means scrapes the wire during insertion of the anchoring portion into the passageway and engages the walls of the passageway to produce an intimate electrical connection between the wire and terminal and to anchor firmly both the wire and terminal member in the passageway.

For assembling the core and terminal arrangement, I provide a method in which the excitation coil is assembled onto the laminations with the insulating sheath extending through the aligned lamination apertures and securing the laminations together. The lead-in wire is then inserted into the central passage of the sheath and the anchoring portion of the male terminal member is urged inwardly into the central passageway, thereby making electrical contact with the wire and cooperating with the sheath to hold firmly the lead-in wire and the male terminal stationary relative to the sheath.

For a better understanding of the invention, reference may be had to the accompanying drawing which illustrates two embodiments of the present invention.

In the drawing:

FIGURE 1 is a front elevational view of an electric motor embodying my invention in one form thereof;

FIGURE 2 is a bottom view of the motor shown in FIGURE 1 broken away in part, to illustrate details of the preferred embodiment of my improved terminal assembly;

FIGURE 3 is a perspective view, broken away in part, of the male terminal member and mounting sheath shown in FIGURE 2 prior to assembly;

FIGURE 4 is an enlarged sectional view of a portion of the structure shown in FIGURE 2 illustrating the present invention after the mounting sheath of the terminal assembly has been secured to the supporting coil laminations but prior to the insertion of the male terminal pin into its final assembled position;

FIGURE 5 is a similar view to FIGURE 4 with the mounting sheath, male terminal pin and coil winding wire secured in their final assembled position; and FIGURE 6 is a perspective view, broken away in part, illustrating a modified form of the male terminal member and mounting sheath shown in FIGURE 2.

Referring now to the drawing, FIGURE 1 illustrates the preferred embodiment of my invention as applied to a small shaded pole induction motor 10 of the fractional horsepower size. Certain inventive features of this motor not forming part of the present invention are disclosed and claimed in my co-pending application Serial No. 802,761, filed on the same date as the present application and assigned to the same assignee. Briefly described, motor 10 comprises a magnetic field core 11 having a yoke section 12 and a coil supporting core section 13.

The yoke section 12 comprises a plurality of stacked or superposed laminations 14 secured together by any suitable means, such as by rivets 15 which project through aligned apertures provided in the different laminations. Each rivet is slightly headed over at each end to keep the laminations of the stack in a relatively tight, compressed relation. Additional lamination securing means in the form of a pair of motor mounting pins 16, received in suitably disposed laterally extending pin receiving apertures, are provided at suitable locations in the yoke section 12. The ends 17 of the mounting pin 16 are further available for supporting the motor on a stationary base member (not shown). Yoke section 12 is defined by an upper polar portion 18 which is bored, as indicated at 19, to receive a rotor member 20. A pair of shaded pole projections or faces 21 and 22 are diametrically disposed on the periphery of bore 19, each projection being encircled by closed rings of copper wires 23 and 24 respectively positioned in suitably provided notches 25. The rings of copper wire form shading coils to accomplish the well-known shading effect in the encircled field pole projection, in a manner well-known in the motor art. The faces of the bore between faces 21 and 22 comprise the main or unshaded poles of the motor. Rotor 20 is mounted in spaced relation to bore 19 and is rotatably journalled in any suitable manner, such as by rotor supporting means, generally indicated at 26. The means 26, as shown, include stationary members or brackets 27, and bearing means 28 rotatably carrying rotor shaft 29.

The bottom portion of the yoke section is integrally formed with the upper polar portion and is composed of a pair of diametrically opposite leg portions 30 and 31 respectively.

As seen in FIGURES 1 and 2 in particular, the coil supporting core section 13 is formed of a stack of laminations 14 in superposed relation, the means for securing the laminations together being hereinafter described. The coil supporting core section comprises a longitudinally extending central leg portion 32 and shoulder portions 33 and 34 integrally formed at each end thereof. A field excitation winding or coil 35 surrounds central leg 32, being confined between shoulders 33 and 34. The coil consists of a large number of turns of coated wire 36, such as copper magnet wire having a resin coating. Coil 35 has lead-in wires or extremities 37 and 38 respectively extending outwardly toward each leg portion of yoke 12. Winding 35 is insulated from core section 13 in any suitable manner, such as by a hardened coating of a thermoplastic material 39. Core section 13, in its assembled position relative to yoke section 12, is disposed between leg portions 30 and 31, forming a bridging means therebetween, with shoulders 33 and 34 in edgewise abutting relationship to the respective adjacent leg portions. Thus, core section 13 completes the magnetic circuit for yoke section 12. When coil 35 is energized, the magnetic field created thereby passes through the core and yoke sections, the pole faces and the rotor, to cause operation of the rotor.

Referring now to FIGURES 2 and 5, there is illustrated my preferred arrangement for connecting each end of the coil wires to a terminal assembly. Although only one terminal assembly will be described in detail, it is understood that a similar connection may be employed for each end of the coil wires. The arrangement comprises a longitudinally extending insulated mounting sheath 40, preferably constructed of a non-conducting tough plastic material, such as nylon, and molded into a circular configuration. The sheath is formed with a central tubular body portion 41 which is adapted to extend through suitably disposed apertures in the individual laminations of section 13, aligned to define a bore 42 for accommodating the body portion 41 of sheath 40. One end of the sheath, generally indicated at 43, is enlarged and has a radially extending abutment or shoulder 44 for engaging an outer face of the coil supporting laminations 14. End portion 45 of the sheath, spaced or remote from enlarged portion 43, is peened over, or riveted as indicated at 46, and tightly engages the opposite outer face of section 13. Thus, the laminations of section 13 are firmly held in a fixed, juxtaposed relation, between the shoulder 44 and peened portion 46 of sheath 40.

Centrally of the mounting sheath 40 is a longitudinally extending bore or passageway 47 which, as illustrated in FIGURE 5, extends axially all the way through the sheath. The passageway is preferably circular in cross section, concentric with the outer cylindrical surface of the mounting sheath 40. The entrance of the passageway 47, contained within the enlarged end portion 43 of the sheath, is enlarged to form a recess 48 for receiving a female quick disconnect member 49, suitably connected to a power source (not shown). FIGURE 5 shows member 49 as being electrically connected by clamping means, indicated at 50 to an external energizing lead 51.

Enlarged end portion 43 is formed with an outer wall surface 52, adapted to engage side 53 of wound coil 35. Wall surface 52 has a slot 54 facing side 53 of the wound coil, through which the coil lead-in wires 37 or 38 are placed. The end of the passageway 47, remote from recess 48, may be reduced in diameter so as to form a smaller concentric bore 55, thus, permitting a greater utilization of material for peening over end portion 45. The inner or central portion of the passageway defines a central chamber 56, adapted to accommodate and retain a male quick connect terminal member or pin 58 composed of conducting material. The entrance of chamber 56 may be beveled or tapered as at 57 to assist in the ease of assembly as will be hereinafter described.

As is more clearly seen in FIGURES 3 and 5, pin 58 is provided with anchoring portion 59 in the form of a thread at its one end and is formed with a male terminal portion 60 at its other end for cooperation with the female quick disconnect member 49. The end of lead-in wire 37 is fixedly secured between anchoring portion 59 of the terminal pin and the inner wall surface 61 of the central chamber 56.

In the assembly of the terminal arrangement, sheath 40, as illustrated in FIGURE 3, is inserted into the aligned apertures of the individual laminations of section 13 with end portion 45 extending inwardly through the lamination apertures and with slot 54 facing central leg 32 of section 13. The sheath is moved forward until its shoulder 44 engages the outer face of the laminations. Thereafter, end 45 of the sheath is peened over firmly against the opposite outer face of the section 13 thereby securing together the laminations in a predetermined position. An insulating coating 39 is then applied, by any suitable means, to the outer faces of the laminations and allowed to harden. Coil 35 is thereafter wound on central leg portion 32 of section 13, between the pair of sheaths 40 and the shoulders 33 and 34, with a free end of the wire hanging loose at each side of the coil for attachment to the terminal assembly. Once the coil has been wound on leg 32, each lead-in wire of the coil is placed through slot 54 and into the central chamber 56 of the adacent sheath, as illustrated in FIGURE 4. Thereafter, terminal pin 58 is inserted into recess 48, passing through beveled entrance 57, which assists in guiding the pin into chamber 56. The sharp edges of the anchoring portions or threads of the pin are directed into contact with the inner wall of the central chamber at is entrance and the threads are forceably urged against lead-in wire 37. Further inward movement of the pin will cause the threads of the pin to wipe the coating material from the wire, thereby baring the wire and providing an excellent electrical contact between the conducting terminal pin and the wire. In addition the sharp edges of the thread will engage the inner surface of chamber 56 and lock the pin 58 against removal. Due to the inherent resiliency of the nylon body, the temporary displaced material of the body portion, which was initially composed by the threads, moves back into position interlocking with the threads locking both the wire and the pin firmly within the sheath member 40. Thus, outward movement of either the wire or the pin, which could otherwise be caused, for example by withdrawal of the female quick disconnect member 49 from the male terminal portion 60 of the pin, will be effectively resisted.

Thus, it can be seen that in the completely assembled terminal unit the pin anchors itself and the wire securely within the sheath. Further, during assembly thereof, the anchoring portion of the pin wipes the wire to provide an excellent electrical connection with the wire. Moreover, the slot and particular wall configuration of the enlarged end portion of the sheath protect the thin wire from injury, while at the same time, the outer wall surface of the same end portion supports each side of the wound coil. Further, the terminal itself is capable of use with any quick disconnect means, which may be attached either to testing apparatus or to a power source for actual motor operation.

A second modification of the terminal assembly is illustrated in FIGURE 6 and comprises a longitudinally extending sheath member, generally indicated at 62, which is preferably formed of molded nylon, as described for my first embodiment. Sheath 62 is provided with an enlarged oval end portion 63 and an oval body portion 64 adapted to extend through suitably disposed apertures of like configuration arranged in section 13 of the motor. Enlarged end portion 63 has formed therein a female quick disconnect receiving recess 65 having an inner bottom wall 66. The outer surface of the bottom wall provides a radially extending abutment or shoulder 67 for engaging an outer face of the coil supporting section 13. Side wall 68 of the end portion 63 extends in an axial direction, being axially higher than the oppositely disposed side wall 69. Side wall 68 provides the support for the side of the wound coil. The relative shortening of wall 69, which does not provide coil support, results in a saving of material which is important for mass production apparatus.

A substantially rectangular longitudinally extending passageway 70 communicates with the bottom wall of recess 65 and extends axially through the length of body portion 65. A pair of oppositely disposed wire receiving grooves 71 are provided in the respective inner side walls of the passageway 70, each groove having a beveled or tapered entrance 72 for assisting in the guidance of the coil wire into the groove during assembly thereof. End 73 of the sheath is adapted to be riveted or peened over against the other face of section 13.

As in the first embodiment, the enlarged portion 63 of the second modification is provided with a wire receiving slot 74 adapted to face the side 53 of the wound coil and arranged to communicate between the coil and recess 65 of the sheath. Thus, the wall 68 of the sheath will provide side supporting for the coil and will afford protection to the coil lead-in wire against damage due to handling of the assembled motor.

The terminal pin or member 75 is formed from a substantiallly rectangular sheet of conducting material and has a male terminal portion 76 at its one end and an anchoring portion 77 at its other end being slightly less in radial height that portion 76. A radially extending shoulder 78 is formed between portions 76 and 77 and is adapted to engage bottom wall 66 of recess 65, thereby limiting the amount of axial penetration of anchoring portion 77 into passageway 70. Opposite side edges 79 and 80 of anchoring portion 77 have anchoring means in the form of a plurality of teeth or serrations 81 disposed thereon which become anchored in the body portion 64 when the terminal member is in a final assembled position. Additional anchoring means, such as a plurality of raised, and axially aligned, projections or teeth 82 are arranged on the respective faces 83 and 84 of the anchoring portion 77. A wire receiving V-shaped notch 85 is provided on the extreme end of anchoring portion 77 of member 75.

The second modification of my terminal arrangement may be assembled in the same manner as heretofore explained for my first and preferred form of my invention. However, it should be noted that it is preferable in my second terminal embodiment, to bend the end of the coil wire in a substantial U before inserting it into passageway 70 of the sheath. The wire may then be positioned over the terminal member, as indicated by the dotted lines in FIGURE 6 of the drawing, with the bight portion of the wire received in the V-notch 85 of the terminal member prior to its insertion. In the alternative, of course, the bend wire could be inserted directly into grooves 71, being guided therein by beveled entrance 72, and the terminal anchoring portion 77 thereafter assembled into a final position by uring it into passageway 70 of the sheath until shoulders 78 engage wall 66 of recess 65, thus limiting further movement of the terminal member into the passageway. In either case, anchoring means 79 and 80 will become embedded into the inner walls of body portion 64 thereby resisting outward movement of the terminal member. Supplemental anchoring means 82 and 83 will break or scrape the wire coating from the wire, baring it. Therefore, as in my first embodiment, an excellent electrical connection is provided between the wire and conducting terminal member. At the same time anchoring means 82 and 83 will firmly hold the coil wire between the insulating sheath and the terminal member thereby preventing removal of the wire from the assembly without first removing the quick connect terminal member.

It will be readily manifest from the foregoing that the advantages of this invention are numerous. My insulated sheath member not only holds core laminations firmly together but, in addition, provides the means for supporting the side surface of the wound core thereby holding the coil in a predetermined position. In addition, the same member protects the end portions of the coil wires and provides the mounting base for a quick connect terminal member. Further, the terminal structure and the method of its assembly ensure an excellent electrical connection between the coil and terminal. Moreover, with this construction, a terminal assembly is provided which can be utilized for motor testing purposes during the manufacture of the motor as well as for electrical operation connections by which the motor may be run in actual practice after the motor has been completely assembled. This arrangement is inexpensive to manufacture, includes very few component parts, and is quickly and easily installed, providing an efficient and mechanically strong electrical connection for attaching the coil to the external energizing means.

It should be apparent to those skilled in the art that, while I have shown and described what at present are considered to be the preferred embodiments of my invention in accordance with the patent statutes, changes may be made in the structure disclosed without departing from the true spirit and scope of the invention, and I therefore intend in the following claims to cover all such equivalent variations as fall within the invention.

What I claim as new and desire to secure by Letters Patent of the United States is:

1. A terminal arrangement for a lead-in wire comprising a longitudinally extending mounting sheath formed of insulating material, said sheath having a longitudinally extending inner passageway for accommodating said wire, and a longitudinally extending male quick connect terminal member composed of conducting material, said member having a terminal end portion and an anchoring end portion spaced from said terminal end portion, said anchoring end portion having projecting means for engaging the inner walls of said passageway and for contacting said lead-in wire, said projecting means contacting said wire during the insertion of said anchoring end portion within said passageway and engaging the walls of said passageway to produce an intimate electrical connection between said wire and said terminal member and to anchor firmly said wire and said terminal member in said passageway.

2. A terminal arrangement for a lead-in wire comprising a longitudinally extending mounting sheath formed of insulating material, said sheath having an enlarged end portion and a body portion, said enlarged end portion having a central recess and said body portion having a central chamber of smaller dimension than said recess and communicating therewith, said wire being received within said chamber, and a longitudinally extending male quick connect terminal member composed of conducting material, said member having a terminal end portion and an anchoring end portion spaced from said terminal end portion, said anchoring end portion having projecting means for engaging the inner wall of said central chamber and for contacting said lead-in wire, said projecting means scraping said wire during the insertion of said terminal anchoring end portion within said chamber and engaging the walls of said chamber to produce an intimate electrical connection between said wire and said terminal member and to anchor firmly said wire and said terminal member in said chamber.

3. A terminal arrangement for a lead-in wire comprising a longitudinally extending mounting sheath formed of insulating material, said sheath comprising an enlarged end portion and a body portion substantially oval in cross-section, said enlarged end portion having a high and low side wall section and a bottom wall forming a central recess therebetween, said high wall section having a wire receiving slot provided therein, said body portion having a longitudinally extending central chamber being smaller in width than said recess and communicating therewith, said central chamber being defined by edge and side walls with a pair of wire receiving grooves in the side walls thereof for receiving said lead-in wire bent substantially in a U shape, and a longitudinally extending substantially rectangular male quick connect terminal member formed of a sheet of conducting material, said member comprising a terminal end portion and an anchoring end portion spaced from said terminal end portion having side and edge surfaces with projecting means formed thereon, a portion of said projecting means scraping said wire during insertion of said terminal into said chamber to produce an intimate electrical connection between said wire and said terminal member, and a portion of said projecting means engaging said walls of said chamber to anchor firmly said wire and said terminal member in said chamber.

4. In an electric device, a magnetic core, a coil mounted on said core and having at least one terminal lead-in wire attached thereto, a terminal arrangement for connecting said lead-in wire to a power source, said terminal arrangement comprising longitudinally extending mounting sheath formed of insulating material positioned at each side of said coil and arranged to extend through apertures provided in said core for accommodating said sheath, said sheath having a longitudinally extending inner passageway for accommodating said wire, and a longitudinally extending male quick connect terminal member composed of conducting material, said member having a terminal end portion and an anchoring end portion spaced from said terminal end portion, said anchoring end portion having projecting means for engaging the inner walls of said passageway and for contacting said lead-in wire, said projecting means contacting said wire during the insertion of said anchoring end portion within said passageway and engaging the walls of said passageway to produce an intimate electrical connection between said wire and said terminal member and to anchor firmly said wire and said terminal member in said passageway.

5. In an electric motor, a magnetic core formed of a plurality of laminations, a coil mounted on said core and having a terminal lead-in wire provided at each side thereof, a terminal arrangement adjacent each coil side for securing said laminations together in juxtaposed relation and for connecting each lead-in wire to a power source, said terminal arrangement comprising a longitudinally extending mounting sheath formed of insulating material positioned adjacent each side of said coil and arranged to extend through aligned apertures formed in said laminations for accommodating said sheath, said sheath having lamination securing means, a longitudinally extending body portion and an enlarged end portion, said enlarged end portion having a central recess for receiving a power source connecting means and said body portion having a central chamber of smaller dimension than said recess and communicating therewith, and a longitudinally extending male quick connect terminal member composed of conducting material, said member having a terminal end portion and an anchoring end portion spaced from said terminal end portion, said anchoring end portion having projecting means for scraping said wire during the insertion of said anchoring end portion into said chamber to produce an intimate electrical connection between said wires and said terminal member and for engaging the inner wall of said central chamber to anchor said wire and said terminal member in said chamber.

6. In an electric motor, a magnetic core formed of a plurality of laminations, a coil mounted on said core and having a terminal lead-in wire provided at each side thereof, a terminal arrangement for securing said laminations together in a juxtaposed relation and for connecting said lead-in wires to a power source, said terminal arrangement comprising a longitudinally extending mounting sheath formed of insulated material positioned adjacent each side of said coil and arranged to extend through aligned apertures formed in said laminations for accommodating said sheath, said sheath having an enlarged end portion providing an abutment face and a riveted over end portion spaced from said enlarged end portion, said laminations being secured together in juxtaposed relation between said face and said riveted over end portion, a longitudinally extending passageway in said sheath, said enlarged end portion having a wall for supporting a side of said coil with a lead-in wire receiving slot formed therein and having an enlarged central recess, said lead-in wire adjacent said slot arranged through said slot and into said passageway beyond said enlarged recess, a male terminal member composed of conducting material having a female terminal receiving end portion and an anchoring end portion at its other end, said anchoring portion having projecting means for engaging the inner walls of said passageway and for contacting and scraping said lead-in wire, whereby said terminal arrangement secures together said laminations, supports the sides of said coil, protects the lead-in wires against injury, provides an electrical connection between the lead-in wires and the terminal member, and firmly anchors said lead-in wire and said terminal member in said mounting sheath.

7. A method of assembling a coil supporting core and a terminal assembly comprising the steps of positioning a pair of longitudinally extending insulated sheaths, each having a central passageway, into spaced apart apertures provided in said core for accommodating said sheaths with an excitation coil arranged between said spaced apart sheaths; securing said laminations firmly together by means of said sheaths, and inserting an anchoring portion of a male terminal member and a lead-in wire provided at each end of said coil into the adjacent sheath passageway whereby said anchoring portion makes electrical contact with said wire and cooperates with said sheath to hold firmly said lead-in wire and said male terminal member stationary relative to said sheath.

8. A method of assembling an excitation coil supporting laminated core and terminal assembly comprising the steps of inserting at least one longitudinally extending insulated sheath, having a central passageway and an enlarged end portion, into aligned apertures provided in each core lamination; peening over the end portion of said sheath spaced from said enlarged end portion thereby rigidly securing said laminations in juxtaposed relation between said end portions; applying insulation to the surfaces of the core adapted to support an excitation coil, positioning said coil on said core with a lead-in wire provided at each end of said coil; and inserting said lead-in wire and an anchoring portion of a male terminal member into said sheath passageway whereby said anchoring portion scrapes said wire during the insertion of said member into said passageway to produce an electrical contact with said wire and to anchor firmly said wire and said terminal member in said passageway.

9. A method of assembling an excitation coil supporting core formed of a plurality of laminations having aligned apertures defining at least one passageway comprising the steps of positioning at least one longitudinally extending insulated terminal mounting member into said passageway, securing said laminations together by means of said terminal mounting member, applying insulation to the surfaces of said core adapted to support an excitation coil, and arranging a coil on said core adjacent said terminal mounting member.

References Cited in the file of this patent

UNITED STATES PATENTS

| | | |
|---|---|---|
| 2,423,750 | Benson | July 8, 1947 |
| 2,501,686 | Merkle | Mar. 28, 1950 |
| 2,711,008 | Smith | June 21, 1955 |
| 2,801,396 | Stegeman | July 30, 1957 |
| 2,873,434 | Drum et al. | Feb. 10, 1959 |